United States Patent [19]

von Resch

[11] Patent Number: 4,557,321
[45] Date of Patent: Dec. 10, 1985

[54] VENTILATOR APPARATUS

[75] Inventor: Julius M. von Resch, Stuttgart, Fed. Rep. of Germany

[73] Assignee: Gretsch-Unitas GmbH, Fed. Rep. of Germany

[21] Appl. No.: 572,577

[22] Filed: Jan. 20, 1984

[30] Foreign Application Priority Data

Jan. 22, 1983 [DE] Fed. Rep. of Germany ... 8301708[U]

[51] Int. Cl.⁴ .......................... F24H 3/06; F24F 7/00
[52] U.S. Cl. ...................................... 165/122; 165/54; 165/166; 165/909; 98/39.1; 237/46
[58] Field of Search ............. 165/58, 59, 54, DIG. 12, 165/47, 66, 122, 125, 166; 98/37, 39; 237/46

[56] References Cited

U.S. PATENT DOCUMENTS 3,666,007 5/1972 Yoshino et al. ........................ 165/59
3,977,466 8/1976 Johansson .............................. 165/59

Primary Examiner—Henry Bennett
Attorney, Agent, or Firm—Toren, McGeady, Stanger, Goldberg & Kiel

[57] ABSTRACT

A room ventilator structured to define therethrough both a primary airstream and a secondary airstream arranged in heat exchange relationship with each other. A heat exchanger located to have both said primary and secondary airstreams flow therethrough is structured to divide both of said streams into numerous smaller partial airstreams with walls made of high thermal conductivity intermediate the partial airstreams to enhance the heat exchange capacity between the streams. The heat exchanger is designed so that it may be installed in the ventilator in a plurality of reversed positions without impairing its function.

14 Claims, 5 Drawing Figures

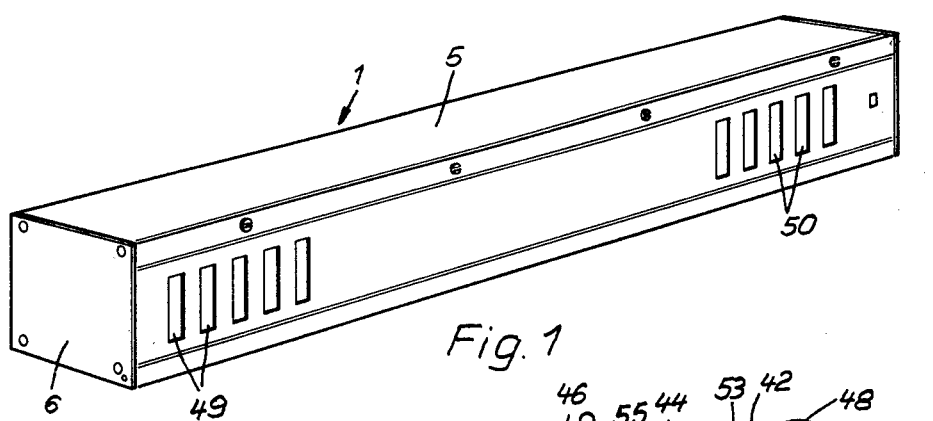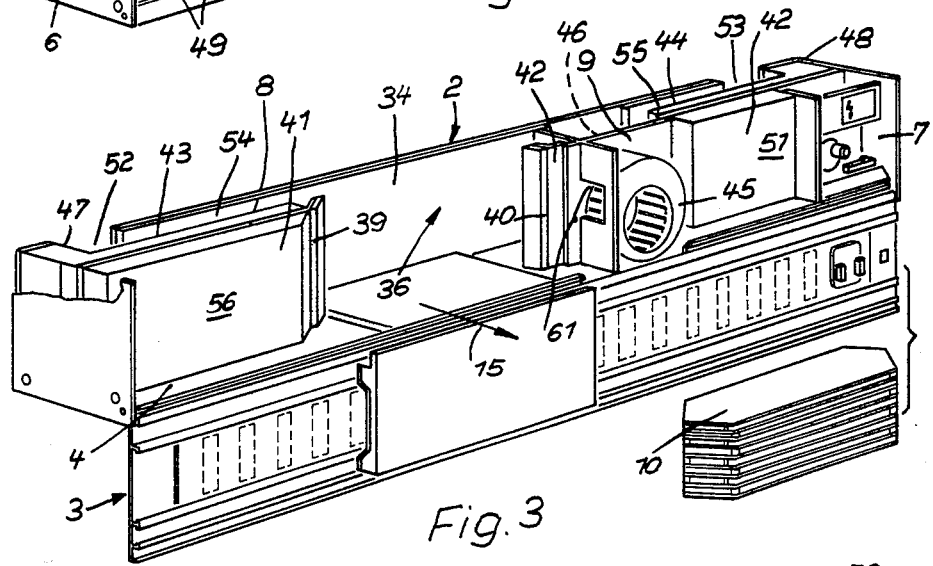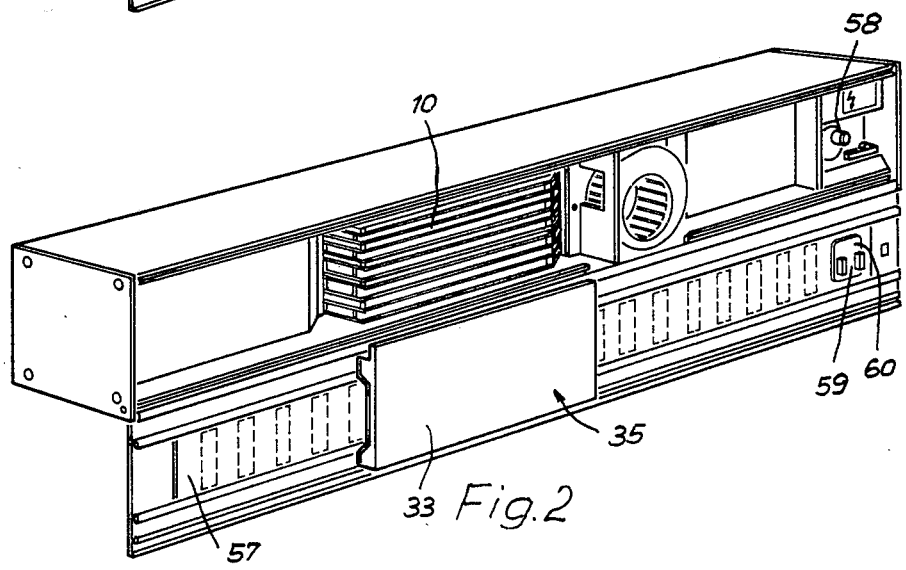

VENTILATOR APPARATUS

The present invention relates generally to ventilator apparatus and more specifically to a ventilator unit having defined therethrough a primary airstream and a secondary airstream with a heat exchanger exposed to the primary and secondary airstream and with blower means for the airstreams.

Ventilators of the type to which the present invention relates are often disposed in the vicinity of a window or door in order to effect ventilation of a room or enclosure. Such ventilators may be designed so as to be suitable for installation in window frames equipped with a sleeve opening for such a ventilator. The ventilator may then extend, for example, over the full width of the panel within which it is installed.

By means of such ventilators, a room or enclosure can be effectively ventilated when the window or door is closed. During cold weather, however, substantial heat may escape from the interior of the room or enclosure through the ventilator with the ventilated air and cold air entering in exchange for the removed air will lower the room temperature or at least increase the heating requirements during ventilation. For reasons related to energy efficiency and comfort, ventilators have been provided with a heat exchanger wherein the heat contained in the secondary or removed air is transferred, at least in part, to the entering primary air. However, the efficiency of such heat exchangers has not been very high and consequently a relatively low amount of heat recovery is achieved.

The present invention is directed toward development of a ventilator of the type described above wherein a high proportion of the heat contained in the secondary air being transported out of the room may be recycled or transferred to the primary air entering the room from the exterior thereof.

SUMMARY OF THE INVENTION

Briefly, the present invention may be described as a ventilator assembly comprising means defining a flow path for both a primary airstream and a secondary airstream through said ventilator assembly, primary and secondary air blower means for said primary and secondary airstreams, respectively, and heat exchanger means located to have both said primary and secondary airstreams flow therethrough in heat exchange relationship with each other, said heat exchanger means comprising separator means dividing each of said primary and secondary airstreams into numerous smaller or partial airstreams, said separator means comprising separator members made of material having high thermal conductivity each interposed between a partial primary airstream and a partial secondary airstream.

As a result of the subdivision of both the primary and secondary airstreams into a maximum number of smaller or partial streams, there is obtained by the structure of the invention a larger heat exchange surface area and hence increased thermal efficiency of the heat exchanger over prior designs. However, in order to compensate the flow velocity, which due to the splitting of the two airstreams is necessarily reduced, it is appropriate not only for the secondary air to be driven through the ventilator by means of a blower, but also the primary air. As a result, good ventilation is achieved despite improved energy recovery. The blowers may be appropriately equipped with variable speed control so that the degree of ventilation may be varied either intermittently or continuously.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE DRAWINGS

In the drawings:

FIG. 1 is a perspective view of a ventilator in accordance with the invention;

FIG. 2 is a perspective view showing the ventilator with a flap cover in the opened position;

FIG. 3 is a perspective view partially broken away showing the ventilator assembly in greater detail;

DETAILED DESCRIPTION OF THE PREFERRED EMBODIMENT

Figure 4:
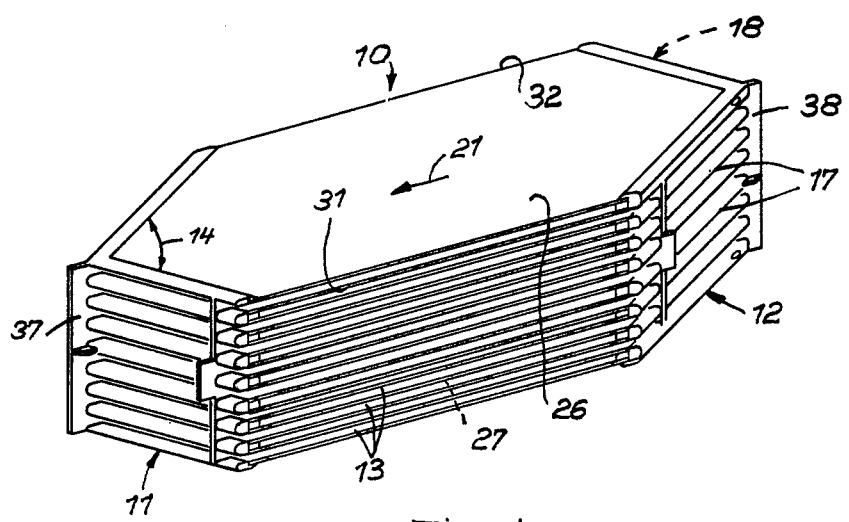
FIG. 4 is a perspective view of the heat exchanger provided in the ventilator assembly.

Referring now to the drawings, wherein similar reference numerals are used to identify like parts in the various figures thereof, the ventilator assembly of the invention is depicted as comprising a housing 1 having a back wall 2, a front wall 3, a bottom plate 4, a cover plate 5, a left-side plate 6 and a right-side plate 7. The assembly is provided with a discontinuous longitudinal wall which extends lengthwise of the assembly and which is correlated approximately with the center of the housing, this discontinuous wall consisting of the sections 8 and 9.

A removable heat exchanger 10 is inserted in sealing engagement into the space between the sections 8 and 9. The heat exchanger 10 is shown in greater detail in FIGS. 4 and 5. As seen from the drawings, the heat exchanger 10 consists essentially of left and right distributor pieces 11 and 12 and of a plurality of plates 13 arranged one above the other as shown in FIG. 4. As will be evident, FIG. 4 clearly depicts the configuration of the plates 13. Each plate is composed of a rectangular part and a triangular part attached at the left and right ends of the rectangular part or section. The two longitudinal edges of the triangular sections of the plates 13 are preferably formed to enclose an angle 14 of about 90°.

The plates 13 consist of a material having good thermal conductivity which may, for example, be aluminum. The distributor pieces may be made of plastic.

Figure 5:
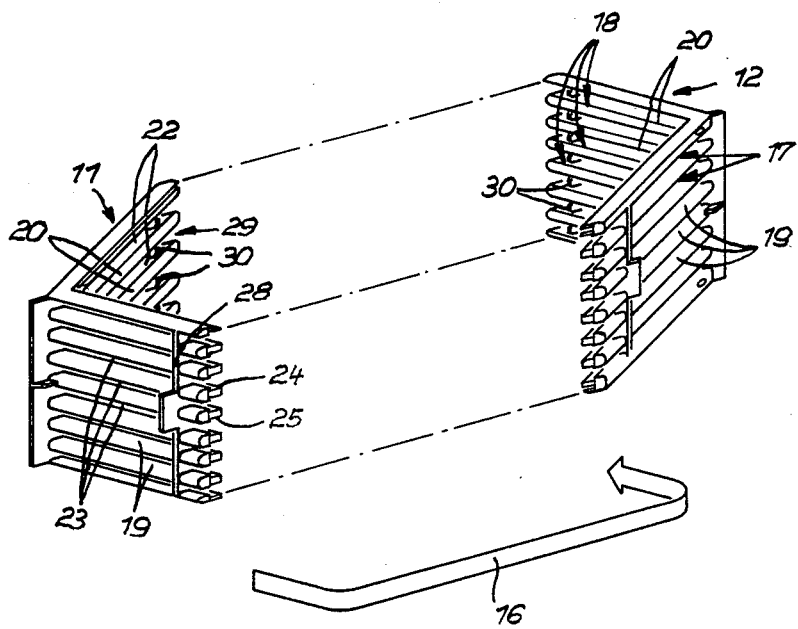
FIG. 5 is a perspective view of the same heat exchanged but shown without the heat exchanger plates in assembled position.

In FIG. 3, there is shown an arrow 15 which indicates the direction in which the heat exchanger 10 may be removed or disassembled from the overall ventilator structure. Of course, the heat exchanger 10 may be inserted or reinstalled in an opposite direction. In FIG. 5, there is also shown an arrow 16 which is intended to schematically indicate that the heat exchanger 10 may be reinstalled in a position rotated by 180° without impairing the function thereof. Thus, it will be seen that the heat exchanger 10 may be removed for cleaning or other maintenance without presenting any problems with regard to reinsertion or reinstallation thereof into the ventilator assembly. Additionally, the heat exchanger 10 may also be reinstalled by being turned upside down as well as being turned 180° in the manner indicated by the arrow 16. This versatility is made possible as a result of the advantageous design of the heat exchanger and of the assembly of the invention.

The heat exchanger 10, as seen in FIGS. 4 and 5, is formed at the right end thereof with inflow slits or openings 17 through which secondary air enters the heat exchanger and with similar inflow openings 18 for the primary air. The inflow openings 17 and 18 are defined by two surfaces of the distributor pieces 11 and 12 which are at right angles to each other and which have been subdivided into individuals rungs or tines between which the secondary air and primary air can flow. Secondary and primary air flows in through the right side distributor piece 12 and flows out of the heat exchanger 10 through the left side distributor piece 11 through the slits or openings formed therein. Consequently, the distributor pieces have a configuration simulating two combs or rakes placed together at an angle. However, in accordance with a special form of the invention, the tines of the latter are offset relative to each other, that is, due to the thickness matching the interspace a tine 19 fits into the gap between two tines 20 and vice versa. Consequently, the total quantity of primary air and secondary air which is supplied to the heat exchanger is divided into numerous partial streams which, in the case of the secondary air, enter through the inflow openings 17, and which, in the case of the primary air, enter through the inflow openings 18. Furthermore, it will be seen that between each two secondary air partial streams, there is provided a primary air partial stream and vice versa. In other words, the partial airstreams of primary air and secondary air are separated each from the other by one of the plates 13.

Since, in cold weather, the secondary air will be warmer than the primary air inasmuch as it is removed from the interior of the space to be ventilated, the secondary air partial streams will operate to heat the plates 13 while the primary air partial streams flowing above and below each pair of plates defining a secondary partial airstream will become heated along the surfaces thereof. As a result, heat recovery will occur and primary air will enter the room warmer than it was at the time that it was introduced into the ventilator It will follow from the foregoing that the primary and secondary partial airstreams will pass through the heat exchanger 10 essentially in directions indicated by the arrow 21; that is, in the lengthwise direction thereof. Because of the arrangement of the outflow openings 22 for the secondary air and of the outflow openings 23 for the primary air, an insignificant deviation from parallel flow occurs. The inflow openings 17 and the outflow openings 22 for the secondary air will likewise lie in approximately parallel planes as do the inflow openings 18 and the outflow openings 23 for the primary air. The structural arrangement of the invention permits installation of the heat exchanger in any desired position; that is, the top and the bottom as well as the left and right sides thereof may be interchanged without affecting the operational principle of the heat exchanger and of the entire ventilation apparatus.

More particularly, as will be seen from FIG. 5, the tines 19 and 20 are rounded at the approach side thereof and thus provide a streamlined surface. On the outflow side, the tines are reduced in thickness at the top and bottom by a recess 24,25, these recesses being dimensioned so that, in accordance with FIG. 4, the top side 26 and the bottom side 27 of the attached plate 13 terminates flush with the thicker portion. As a result, flow losses during entrance and exit of the respective partial airstreams into the heat exchanger 10 are avoided.

Additionally, for stiffening and also for the formation of retention elements for the plates 13, the end regions of the tines 19,20 are joined together by a strip 28, 29 which likewise is formed approximately in the shape of a comb. The teeth of these comb-configurations can be clearly seen in FIG. 5 and are identified by reference numeral 30. Insert between a comb tooth 30 and a tine 19 or 20 is a correlated slanting edge of a plate 13.

Longitudinal plate edges 31 and 32 are situated between distributor pieces 11 and 12 and covered by means of an elastic seal plate 33, 34 for each. These seal plates simultaneously form soundproofing plates 35, 36 of the ventilator. In the case of a soundproofing plate 36, only a section thereof is utilized as the seal plate 34 and, as seen in FIG. 3, it is longer than the heat exchanger 10 and is located on the inner side of the back wall 2. The soundproofing plate 35, on the contrary, is identical with the seal plate 36 and it is retained on the inner side of the front wall 3 which serves as the flap cover. Merely by closing this flap cover there may be achieved a tight application of the seal plates 33 and 34 against the longitudinal plate edges 21 and 32. Additionally, the webs 37 and 38 at the outer angle of the distributor piece 11, 12 are thereby also pressed against their seal surfaces 39,40. These seal surfaces are formed by the inner ends of additional soundproofing plates 41 and 42 which are disposed in FIG. 3 on the front side of the section 8, 9 of the discontinuous longitudinal wall, with their inner ends pointing toward each other and being bent backwardly somewhat as is shown in the drawing.

On the rear surface of the section 8 and 9 of the discontinuous longitudinal wall there are provided additional soundproofing plates 43 and 44. The soundproofing plates 42 and 44 are in two parts and a secondary air blower 45 and a primary air blower 46 which is covered by section 9 are arranged between the sections. Essentially, these provide the blower means of the invention which comprise a dual blower having two blade wheels. In accordance with FIG. 3, soundproofing plates 47 and 48 are disposed also on the inner face of the side plates 6 and 7. The soundproofing simply represents an advantageous development of the ventilator and the soundproofing material may be omitted if desired unless it assumes an additional function.

The housing front wall 3 or, respectively, the flap cover, has a group of flow openings 49, 50 in its left and right end regions. Secondary air enters the ventilator through the flow openings 50 and then enters into a space 51. From there, it is conveyed by means of the secondary air blower 45 to the inflow openings 17 of the heat exchanger. Located in positions analogous to the positions of the flow openings 49 and 50, there are provided in the end regions of the back wall 2 at opposite ends thereof one or more flow openings 52, 53. In the embodiment depicted, only one such flow opening is provided in each instance. Secondary air having gone through the outflow openings 22 of the heat exchanger 10 will pass into a space 54 behind section 9 of the discontinuous longitudinal wall and will leave this space through the flow opening 52, which is directed toward the outside or exterior.

In an analogous manner, outside air enters through the flow opening 53 into a space 55 from where the primary air blower 46 transports it to the inflow openings 18 of the heat exchanger 10. From the outflow openings 23 of the heat exchanger, the primary air which has now been heated due to heat exchange from the secondary air, will flow into a space 56 which is opposite the space 54. By means of the flow openings 49, the heated air will enter the room to be ventilated. The exit opening of the secondary air blower 45 is identified by reference numeral 61 and the exit opening of the primary air blower 46 is designated in a like manner.

Flow openings 49 and 50 are designed in a manner known from register ventilation and are spaced from each other. Consequently, they can be closed or opened by means of a register 57. Appropriately, a continuous register is used for which reason the seal plate 33 is recessed in its inner face in the manner shown in FIG. 2. The register is preferably actuated by a motor for which purpose an eccentrically revolving pin 58 is provided. This pin engages in a slot 59 of a coupling piece 60 connected with the register 57 and the slot extends parallel to the longitudinal axis of the register ventilation opening.

Thus, in accordance with the foregoing, it will be seen that, in the preferred embodiment of the invention, the inflow openings for the partial primary airstream as well as for the partial secondary airstreams are located at one end of the heat exchanger and the outflow openings for the primary and secondary partial streams are located at the opposite end. This makes possible especially long flow paths in the longitudinal direction of the ventilator and, hence, it also operates at the same time to enable the use of a comparatively elongated and therefore effective heat exchanger. The height and depth of such ventilators usually are fixed as a result of which also the size of the heat exchanger in the two-dimensional directions is not capable of being freely selected. However, if, on the basis of this design, both the primary and second air is guided over a comparatively large path in the longitudinal direction of ventilation through the heat exchanger, this will obviously contribute to improvement of the desired effect. It will also be seen that, although in the ventilator in accordance with the invention, air enters and leaves in a cross-wise path taken relative to the longitudinal axis of the ventilator, the flow path in the longitudinal direction is much longer than in the transverse direction.

In accordance with a further development of the invention, it will be seen that the inflow openings for the primary and secondary air, on the one hand, and the outflow openings, on the other hand, form therebetween an acute, preferably approximately right angle. In this manner, there may be obtained inflow and outflow openings whose width corresponds approximately to that of the width and depth of the heat exchanger. Consequently, flow losses at these points can be kept small.

In accordance with a further development of the invention, the inflow and outflow openings of the primary air, on the one hand, and the inflow and outflow openings of the secondary air, on the other hand, are arranged in each instance in approximately parallel planes. In this manner, the heat exchanger may take the form of a parallelepipedon having triangular prisms at both ends. If the elongated ventilator is installed horizontaly, the tops of the prisms extend in the vertical direction, that is, when used in connection with a window, parallel to the window plane.

Advantageously, the heat exchanger may be formed to consist of two substantially angular distributor pieces or manifold sections and the plates arranged between them with triangular plate ends opposite each other, with at least the plates being made of a material of high thermal conductivity with each angle leg of each distributor piece having a number of air passage slits or openings corresponding to the number of plates. In order that the air will not escape laterally between the two distributor pieces, an appropriate seal must, of course, be provided along the longitudinal edges of the plates. For this purpose, there is used appropriately a front and back plate extending over the total height and length of the heat exchanger.

If the heat exchanger is to terminate at the top and bottom with a heat transfer plate, then the number of plates exceeds the number of air passage slits by one. In order that partial airstream inlet openings which are as large as possible may be made available, it is desirable to provide the two angle legs with slots over their entire width so that in all a structure will result which represents a comb-shape or rake-like configuration with rows of tines arranged at an angle to each other. To insure the necessary stiffening, it is advantageous to provide in the end region of the rake tines a connecting strip or the like. The latter may approximately be designed so that it can be used at the same time for holding the plates.

In accordance with a further variation, the invention provides that the planes of the plate top and the underside terminate flush with the plane of the inflow or outflow openings to keep flow resistance as low as possible. This goal is achieved in particular by reducing the tines along the long edge associated with the interior of the heat exchanger as a recess above and below, the height of the recess corresponding to the plate thickness. Furthermore, it is advantageous is this connection to streamline the approach edge of the tines by rounding them or making them with a wedge shape.

With a view toward favorably reducing the expense of manufacture, it is advantageous if the plates are held in the distributor pieces by a snap-retention mechanism. Here, the utilization of plastic is suitable for the manufacture of the distributor pieces because corresponding clamping and holding elements for the plates may then be molded or extruded directly in place. Stiffening in the region of the free tine ends is then particularly useful for applying tongues or similar holding elements.

The longitudinal plate edges between the distributor pieces are, in accordance with a further embodiment of the invention, covered with an elastic seal plate for each. The latter may hug the longitudinal plate edges in a sealing manner so that partial airstreams have no escape routes at these points. A preferred arrangement provides that the seal plates be formed at the same time as soundproofing plates of the ventilator. Accordingly, the seal plates can be utilized with a two-fold purpose, both for sealing and for soundproofing. As a rule, soundproofing plates are also heat insulating so that a supplementary property may also be provided.

The ventilator housing is provided with a front wall which operates as a cover member which may be opened to permit access to the interior of the ventilator. The provision of a cover at the ventilator housing ensures easy access to the interior of the ventilator so that it can be easily cleaned. In particular, the large cover facilitates removal of the heat exchanger which is appropriately removably installed in the ventilator. Due to the provision of a front seal plate at the cover and also due to a removable connection between a rear seal plate and the heat exchanger, the interior of the heat exchanger becomes advantageously easily accessible by removal thereof so that it can be thoroughly cleaned in a simple manner. Furthermore, with the heat exchanger removed, cleaning of the interior of the ventilator is greatly facilitated.

As a result of the structural organization of the ventilator assembly, the heat exchanger may be readily and easily separated from the rear seal plate when being removed. Removable installation of the heat exchanger naturally also requires a good seal in the region where the inflow and/or outflow openings are located adjacent the two ends of the heat exchanger and, in particular, where they come into proximity with each other. For this reason, it is advantageous to form the outer corner of each distributor piece with the cross web bearing against the internal seal strip of the ventilator especially since it is pressed on at this point with the aid of the flat cover in its closed position. In the latter case, special fastening elements for securing the seal areas are unnecessary.

A further significant feature of the invention is the provision of the inner longitudinal wall which is discontinuous and separated by the heat exchanger, the wall being covered on both sides with soundproofing material, a marginal region of the soundproofing material forming at the same time the elastic seal strip for the cross web of the associated distributor piece. Together with the lower and upper housing walls, the front and rear walls and the end-side limiting walls, this longitudinal wall forms the flow ducts for the primary and secondary air situated outside the heat exchanger; that is, the connection from the flow openings of the ventilator to the entrance and exit openings of the heat exchanger. By equipping these walls with at least soundproofing material, noise is maintained low and fan noises in the interior of the room will be minimized.

The primary and secondary air blowers are advantageously formed together as a dual blower with two blade wheels, with one part of the blower means including one blade wheel and one blower housing being located on either side of the discontinuous longitudinal housing wall. Accordingly, a common drive motor for both blowers will suffice and this contributes not only to cost reduction, but also to compact construction.

In accordance with a further preferred embodiment of the invention, the flow openings, at least in the housing cover, are covered or cleared by means of a register and, in particular, a common register whereby at least the cover of the ventilator serves as register ventilation. This contrasts with conventional register ventilation in that closable ventilation openings are provided only at the outer regions of the cover. By means of one group of the openings, room air enters the ventilator and by means of the other group, the preheated fresh air is introduced. Advantageously, the ventilation register may extend over the full length of the cover, but then the soundproofing plate present thereon must be formed so that it will not hinder register movement.

Thus, it will be seen that, in accordance with the present invention, there is provided a ventilator assembly which operates to maintain heat loss as low as possible when ventilating a room through the ventilator during cold weather as a result of the ventilator being equipped with the heat exchanger 10. Cleaning of the ventilator is facilitated as a result of the fact that the heat exchanger can be readily removed. The partial streams of secondary and primary air are divided by the heat exchanger into adjacent partial streams in each instance and the heat of the secondary air is readily transferred to the cooler primary air by the partitions formed by the plates 13 which are made of material having high thermal conductivity.

Not only is the heat exchanger very effective as a result of its design, but it is also quite versatile in that it can be installed with either side up and with the right and left ends interchanged without impairing the function of the ventilator. The transport of air through the heat exchanger 10 occurs by means of the primary and secondary air blowers 46, 45 and the seal plates 33 and 34 operatively associated with the heat exchanger are attached to the front wall 3 and the back wall 2, respectively, designed as a flap cover and forming at the same time part of the soundproofing of the ventilator.

While a specific embodiment of the invention has been shown and described in detail to illustrate the application of the inventive principles, it will be understood that the invention may be embodied otherwise without departing from such principles.

What is claimed is:

1. A ventilator assembly, comprising:
   a generally elongated ventilator housing formed as a parallelepiped having a first and a second end with a front wall thereon formed as a flap cover and with a rear wall;
   air inlet openings provided in said front wall at one of said first and said second ends and in said rear wall at one of said first and said second ends;
   air outlet openings provided in said front wall at the other of said first and said second ends and in said rear wall at the other of said first and said second ends;
   a heat exchanger unit removably mounted within said housing between said first and second ends, said heat exchanger unit having one end facing said first end of said ventilator housing and another end facing said second end of said housing;
   means defining a primary airstream between said air inlet openings in said rear wall and said air outlet openings in said front wall;
   means defining a secondary airstream between said air inlet openings in said front wall and said air outlet openings in said rear wall;
   said heat exchanger unit being located to have both said primary and said secondary airstreams flow therethrough in heat exchange relationship with each other, said heat exchanger unit comprising separator means dividing each of said primary and said secondary airstreams into numerous smaller partial airstreams, said separator means comprising separator members made of material having high thermal conductivity, each separating a smaller partial primary airstream from a smaller partial secondary airstream;
   said one end of said heat exchange unit and said another end of said heat exchanger unit each being formed with inlet openings and outlet openings for both said primary and secondary partial airstreams, with each of said ends of said heat exchanger unit being defined by a pair of walls extending relative to each other at an angle not greater than 90°;
   said inlet and outlet openings in said ends of said heat exchanger unit for said primary partial airstreams being arranged in planes approximately parallel to each other and said inlet and outlet openings for said secondary partial airstreams being also arranged in planes approximately parallel to each other;

each of said ends of said heat exchanger unit being formed by an angular distributor piece, said separator members comprising plates arraged to extend between said angular distributor pieces, each of said plates being formed with triangular ends opposite each other, with said distributor pieces including angular legs each of which comprise air passage slits forming said inlet and outlet openings with a number of said slits being approximately the same as the number of said plates; and primary and secondary air blower means for blowing said primary and secondary airstreams, respectively, through said flow paths.

2. An assembly according to claim 1, wherein each of said inlet openings and each of said outlet openings are separated from each other by webs having a width which corresponds to the width of said slits, said webs being formed in web groups of said inlet openings, on the one hand, and web groups of said outlet openings, on the other hand, which are offset relative to each other by a web width in each instance.

3. An assembly according to claim 1, wherein said plates comprise a top plate and a bottom plate with the plane of said top plate and bottom plate being flush with the plane of said inlet and said outlet openings, respectively.

4. An assembly according to claim 2, wherein said plates are held in said distributor pieces by a snap-retention mechanism.

5. An assembly according to claim 1, wherein said plates are formed with longitudinal edges situated between said distributor pieces and covered by an elastic seal plate for each.

6. An assembly according to claim 5, wherein said seal plates are formed to provide soundproofing for said assembly.

7. An assembly according to claim 1, wherein said flap cover has a front seal plate disposed on the inside thereof between said inlet and outlet openings.

8. An assembly according to claim 7, wherein said separator means comprise a plurality of generally parallel plates having rear longitudinal plate edges located on the rear side of said housing, said assembly further comprising a soundproofing plate which serves in part as a seal plate applied against said rear longitudinal plate edges and disposed on the inside of a back wall of said housing, said soundproofing plate being provided with at least one opening for primary air and one opening for secondary air.

9. An assembly according to claim 1, further comprising a web member formed at each of said distributor pieces extending transversely of said plates and an internal seal strip within said ventilator assembly, said web member and said seal strip cooperating to divert said primary airstream to one side of said heat exchanger and said secondary airstream to an opposite side of said heat exchanger.

10. A ventilator assembly according to claim 9, further comprising a discontinuous inner longitudinal wall formed in two parts having said heat exchanger therebetween, said two parts being covered on both sides with soundproofing material with a marginal region of said soundproofing material forming an elastic seal strip for said web of an associated distributor piece.

11. An assembly according to claim 10, wherein said primary and secondary air blower means comprise a pair of blowers located on either side of said parts of said discontinuous longitudinal wall and associated with flow openings for said secondary and primary airstreams, respectively.

12. An assembly according to claim 11, wherein said primary and secondary air blower means comprise air blowers formed as a dual blower with two blade wheels and blower housings, one blade wheel and one blower housing each being located on one side of said discontinuous longitudinal wall.

13. An assembly according to claim 7, further comprising common register means for covering and uncovering said openings in said flap cover.

14. An assembly according to claim 13, wherein said register means are mounted on said housing so as to be movable forwardly and rearwardly by means of a drive motor, said drive being effected through an eccentric pin-slot mechanism.

* * * * *